(12) United States Patent
Matsuno

(10) Patent No.: US 6,185,496 B1
(45) Date of Patent: Feb. 6, 2001

(54) APPARATUS FOR CONTROLLING A VEHICLE BASED ON ROAD DATA

(75) Inventor: Koji Matsuno, Tokyo (JP)

(73) Assignee: Fuji Jukogyo Kabushiki Kaisha, Tokyo (JP)

(*) Notice: Under 35 U.S.C. 154(b), the term of this patent shall be extended for 0 days.

(21) Appl. No.: 09/238,148

(22) Filed: Jan. 28, 1999

(30) Foreign Application Priority Data

Jan. 29, 1998 (JP) .................................. 10-017431

(51) Int. Cl.$^7$ .......................... G08G 1/0969; G06F 17/00
(52) U.S. Cl. ............................................. 701/70; 701/208
(58) Field of Search .................................. 701/300, 301, 701/28, 223, 208; 340/438, 441; 342/70, 71; 348/118, 119

(56) References Cited

U.S. PATENT DOCUMENTS

| 5,315,295 | 5/1994 | Fujii | 340/936 |
|---|---|---|---|
| 5,752,214 | * 5/1998 | Minowa et al. | 701/111 |
| 5,832,400 | * 11/1998 | Takahashi et al. | 701/53 |
| 5,902,345 | * 5/1999 | Minowa et al. | 701/96 |
| 5,925,087 | * 7/1999 | Ohnishi et al. | 701/70 |
| 5,978,731 | * 11/1999 | Matsuda | 701/208 |

FOREIGN PATENT DOCUMENTS

738946 * 10/1996 (EP) .

* cited by examiner

Primary Examiner—Michael J. Zanelli
(74) Attorney, Agent, or Firm—Smith Gambrell & Russell, LLP (57) ABSTRACT pg,2 A vehicle dynamic control system carries out smooth and natural vehicle dynamic control even when road data are discontinuous. In this system, a vehicle dynamic control value calculator calculates a vehicle dynamic control value based on vehicle running conditions and road data from a road data recognizer. The vehicle dynamic control value calculator, upon receipt of a discord signal and after a predetermined number of calculation cycles pass, reduces gradually the vehicle control value to 0 (zero). The calculator increases the vehicle dynamic control value gradually to a value corresponding to the road data and the vehicle running conditions in a predetermined number of calculation cycles, when reception of the discord signal is discontinued. When the calculator receives the discord signal but a predetermined number of calculation cycles are not counted yet, the vehicle dynamic control value is calculated based on road data previously detected.

14 Claims, 7 Drawing Sheets

APPARATUS FOR CONTROLLING A VEHICLE BASED ON ROAD DATA

BACKGROUND OF THE INVENTION

This invention relates to a vehicle dynamic control system, which carries out vehicle dynamic control according to road data recognized thereby.

Currently developed are a variety of vehicle dynamic control techniques, utilizing a navigator or the like. Vehicle dynamic controls, such as warning control, deceleration control and so on, are carried out according to road data of the route in front of the vehicle, which are obtained by processing road map data inputted from the navigator.

In order to carry out such vehicle dynamic controls properly, it is required to accurately detect road data relating to the actual road in front of the vehicle. But road data fidelity can not be guaranteed when detecting road data by processing road map data from the navigator only.

Other technology, as disclosed by Japanese Patent Laid-Open No. 287395/1996, is presented, wherein cameras are installed for determining a road pattern, which is then transformed into road data. The road pattern is determined by projecting and transforming images taken by cameras, which are corrected by road inclination angle and radius curvature data, inputted from the navigator. Then, according to the road data, vehicle dynamic control is carried out.

Image data detected by sensors such as cameras are, however, subject to limitations due to weather and vehicle running conditions. Therefore, the system disclosed in Japanese Patent Laid-Open No. 287395/1996 may become remarkably degraded in its ability to, or can not, obtain precise road data, when the image data suddenly change depending on weather and vehicle running conditions.

In such a case, road data become discontinuous, bringing about difficulties in vehicle dynamic control, so that smooth control can not be carried out, resulting in not only an uncomfortable feeling for a driver, but also a risk due to strained control.

SUMMARY OF THE INVENTION

The present invention provides a vehicle dynamic control system which can carry out smooth and natural control even when road data become discontinuous.

In order to achieve the object, a vehicle dynamic control system according to the invention comprises: road data recognizing means for recognizing road data of a traveling route in front of a vehicle and vehicle dynamic control value calculating means for calculating vehicle dynamic control values to control vehicle movement based on the road data and the running conditions of the vehicle. The vehicle dynamic control value calculating means is characterized in that, once road data recognition becomes unreliable, vehicle dynamic control values are calculated for a predetermined time based on road data recognized just before the time when road data recognition became unreliable.

The vehicle dynamic control system according to another aspect of the invention includes the feature that the road data recognizing means judges that road data recognition becomes unreliable when road data is not available or the road data change suddenly.

The vehicle dynamic control system according to another aspect of the invention includes the feature that the road data recognizing means comprises a $1^{st}$ (first) road data detecting means for detecting $1^{st}$ (first) road data based on road map data, a $2^{nd}$ (second) road data detecting means for detecting $2^{nd}$ (second) road data based on road conditions which are detected, as the vehicle runs along the road, and a road data determining means for determining final road data based on the $1^{st}$ road data and the $2^{nd}$ road data when the $1^{st}$ road data and the $2^{nd}$ road data are about the same.

The vehicle dynamic control system according to another aspect of the invention includes the feature that the vehicle dynamic control value calculating means stops vehicle movement control when the road data recognizing means judges that the $1^{st}$ road data and the $2^{nd}$ road data are not same.

The vehicle dynamic control system according to another aspect of the invention includes the feature that the vehicle dynamic control value calculating means changes gradually the vehicle dynamic control values so that vehicle movement control is restrained when the road data recognizing means judges that the $1^{st}$ road data and the $2^{nd}$ road data are not the same.

The vehicle dynamic control system according to another aspect of the invention includes the feature that the vehicle dynamic control value calculating means gradually returns the vehicle dynamic control values to proper values corresponding to the road data and the vehicle running conditions when road data are recognized again by the road data recognizing means after the vehicle dynamic control value calculating means changes the vehicle dynamic control values so that vehicle movement control is restrained.

The vehicle dynamic control system according to another aspect of the invention includes the feature that the vehicle dynamic control value calculating means calculates at least an aimed deceleration of the vehicle.

The vehicle dynamic control system according to another aspect of the invention includes the feature that the road data comprises at least a distance to the nearest curve.

The vehicle dynamic control system according to another aspect of the invention includes the feature that the road data comprises at least a radius of curvature of the nearest curve.

The vehicle dynamic control system according to another aspect of the invention includes the feature that the road data comprises at least a road width of the nearest curve.

DETAILED DESCRIPTION OF PREFERRED EMBODIMENTS

A preferred embodiment of the present invention is described according to the accompanied drawings. FIG. 1 through FIG. 8 show an embodiment of the present invention.

Figure 1:
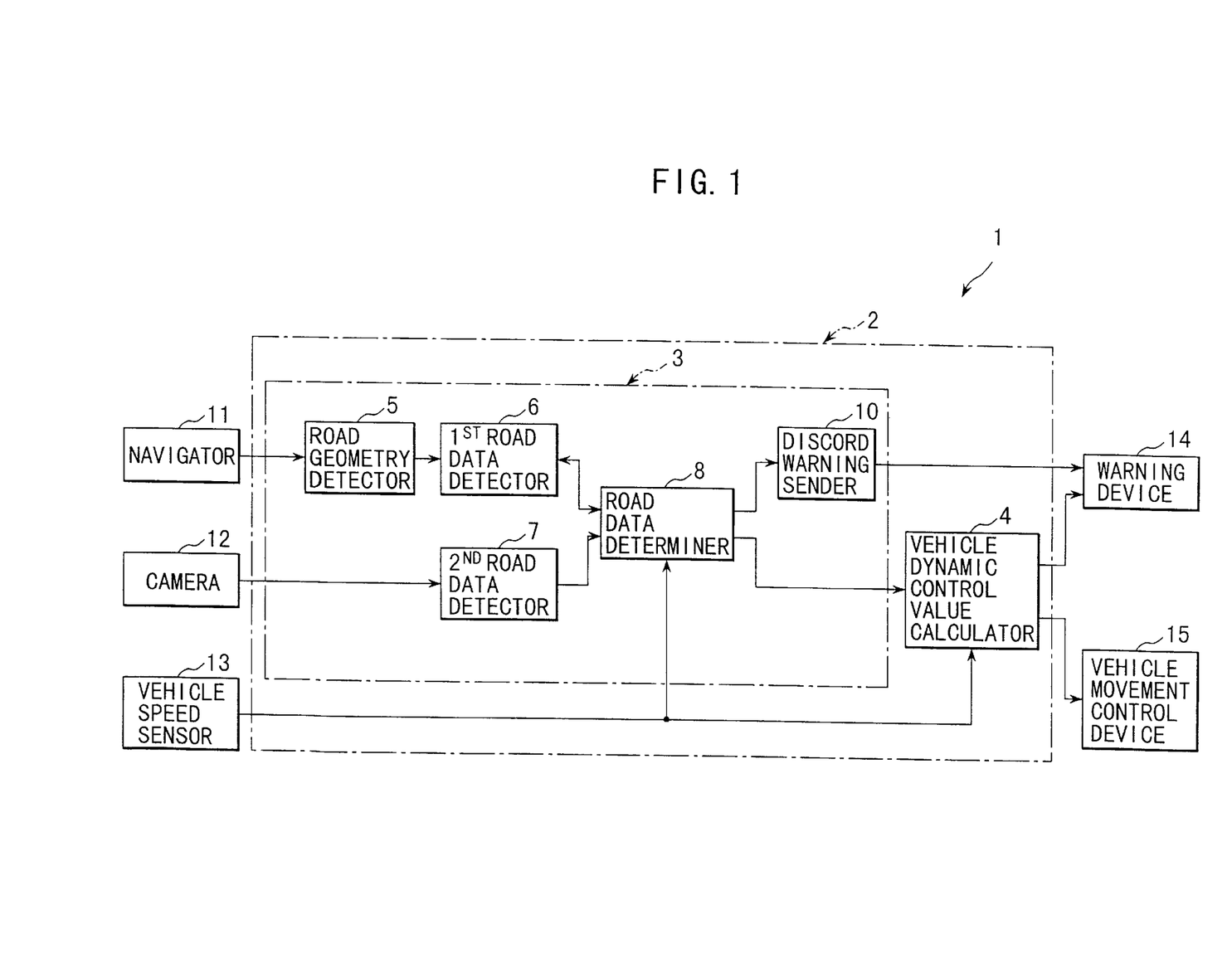
FIG. 1 is a block diagram showing the general construction of a vehicle dynamic control system equipped with a road data recognizing device.

Referring to FIG. 1, reference number 1 generally indicates a vehicle dynamic control system. A controller 2 of the vehicle dynamic control system 1 consists mainly of a road data recognizer 3 and a vehicle dynamic control value calculator 4.

To the controller 2, a navigator 11 sends road width data and node data, representing road position and inflection, out of road map data and running information, such as vehicle position. A camera 12 sends the controller 2 data representing conditions of a road in front of the vehicle. A vehicle speed sensor 13 sends the controller 2 signals representing vehicle speed V. A steering wheel angle sensor (not shown), a yaw rate sensor (not shown) and a longitudinal acceleration sensor (not shown) send the controller 2 steering wheel angle data θH, yaw rate data γ and data representing vehicle running conditions, such as longitudinal acceleration, respectively.

The controller 2 determines whether the vehicle can pass an approaching curve stably enough or not, and then gives warnings to the driver by a warning device 14, i.e., a buzzer, a warning voice generator or a warning light, if necessary. In addition to the warning, the controller 2 makes a vehicle movement controller 15 carry out transmission shift down, engine turbo-charging pressure reduction, fuel cut, complete throttle closing, braking application or increasing braking force, if necessary.

Figure 2:
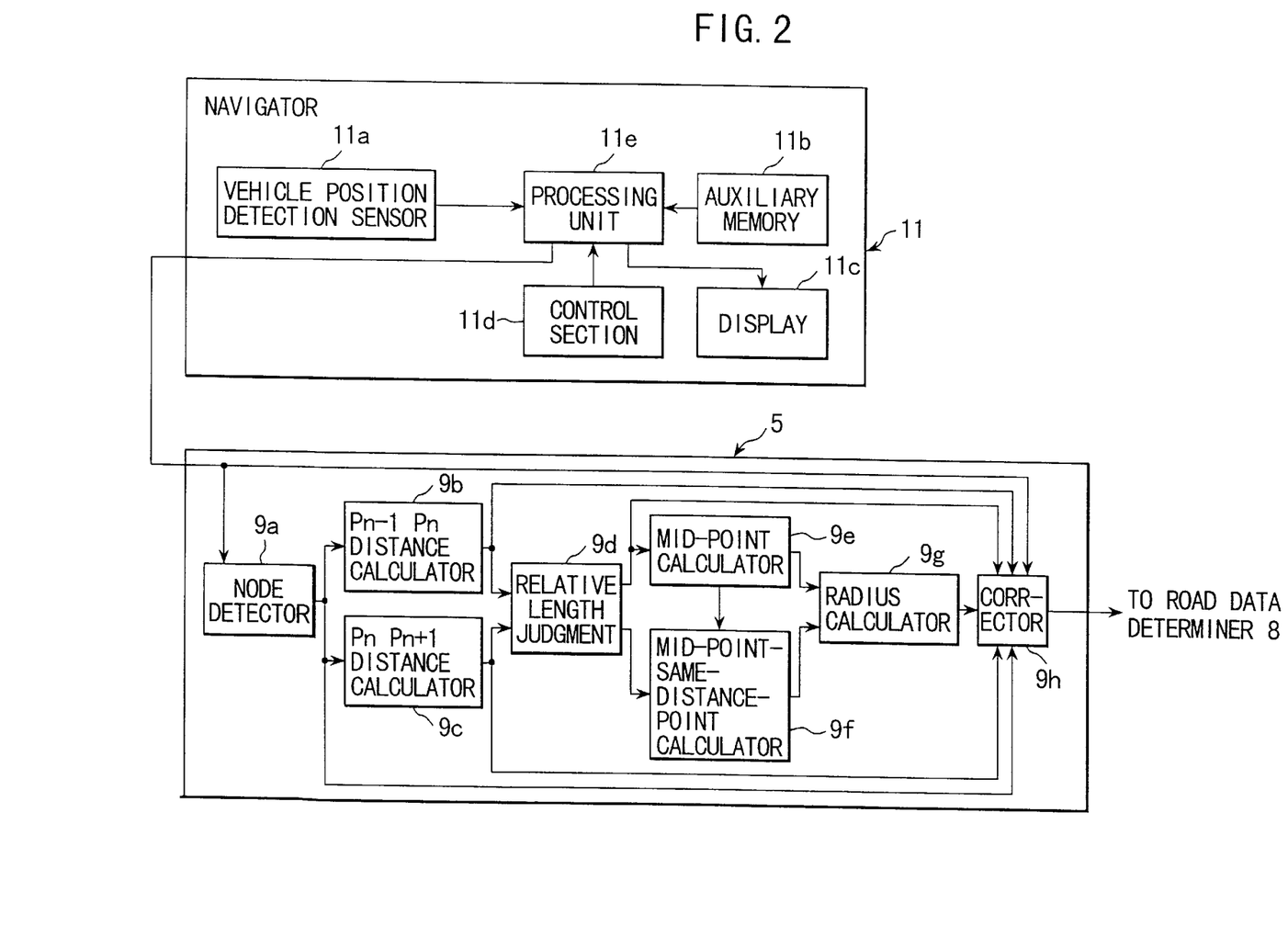
FIG. 2 is an illustration showing the construction of a $1^{st}$ road data detector for detecting road data based on data from a navigator.

In general, as shown in FIG. 2, the navigator 11 consists mainly of a vehicle position detection sensor 11a, an auxiliary memory 11b, a display 11c, a control section 11d, and a processing unit 11e.

The vehicle position detection sensor 11a gathers information related to vehicle position. The sensor 11a consists mainly of a GPS (Global Positioning System) receiver to receive positioning signals from GPS satellites so as to determine the position of the vehicle; a geomagnetic sensor to detect a running direction of the vehicle; and wheel speed sensors outputting pulse signals synchronized to wheel rotations.

The auxiliary memory 11b is a CD-ROM device, loading a CD-ROM storing road map information including road data and topographical data. The CD-ROM stores road map information in a plurality of hierarchal levels in various scales, and it further stores road kind information, i.e., motor ways, ordinary national roads and local roads, and passage conditions such as road widths and intersections. Road geometry data included in the road map information consist of node data with given intervals.

Road width data are reduced in several rankings as shown below and then stored:

W1=0:not investigated yet
W1=1:0 m<W<3 m
W1=2:3 m<W<5.5 m
W1=3:5.5 m<W<13 m
W1=4:13 m<W The display 11c is a liquid crystal display which displays maps, the vehicle position (latitude, longitude and altitude), direction, the position of the vehicle on the map, and the optimum routing up to a destination.

A touch panel, as the control section 11d, is integrated in the display 11c to provide control functions, such as map scale change, and display switching for detailed place name display, area information display and route guidance display.

The processing unit 11e composes the vehicle running information inputted from the vehicle position detection sensor 11a and the road map information registered from the auxiliary memory 11b, while conducting map matching and other processing. The results are sent to the display 11c following an operating signal sent from the control section 11d, so as to display the present position of the vehicle, a map of the neighborhood, an optimum route to the destination and other information. The node data are outputted to the road data recognizer 3, if necessary.

The camera 12 consists of, for instance, a pair of CCD cameras (not shown), taking a pair of stereoimages of objects in front of the vehicle by stereo photography. The pair of CCD cameras are used as outside object detecting means in this embodiment. A single CCD camera may be used instead of a pair of CCD cameras. Moreover, a super sonic sensor or an infrared sensor may substitute for the camera 12.

The warning device 14 consists of chimes, a buzzer, a voice warning generator or a warning light or a combination of the aforementioned. Sound warnings, e.g., a voice warning "Reduce speed for the curve in front," recorded in a CD-ROM of the navigator 11 or warning chimes/buzzer, is carried out at the warning level. A voice warning "Braking has been done," and a light warning are carried out at a level of forced braking.

The manner of making a warning are not limited to the above. It may include selective usage of plural voice warnings for the warning level and the level of forced braking. The operator's attention to the position of a curve to be the object for warning or braking control may be provided by voice or displayed in color on the map of the navigator 11.

The vehicle movement controller 15 includes a deceleration controller consisting of, e.g., a transmission controller (not shown), an engine controller (not shown) and a brake controller. The vehicle movement controller 15 carries out one of or a combination of the following controls, as appropriate according to input from the controller 2: forced braking; reducing turbo charging pressure; fuel cut; throttle closing control; shift down by the transmission controller; braking application by the brake controller and increasing of braking force.

The road data recognizer 3 mainly consists of a road geometry detector 5, a $1^{st}$ (first) road data detector 6, a $2^{nd}$ (second) road data detector 7, road data determiner 8 and a discord warning sender 10. The road data recognizer 3 calculates road data I within a predetermined range, e.g., 300 m in front, and outputs the data to the vehicle dynamic control value calculator 4.

A $1^{st}$ (first) road data detecting means consists of the navigator 11, the road geometry detector 5 and the $1^{st}$ (first) road data detector 6. The road geometry detector 5 calculates road geometry data of the road in front of the vehicle within a predetermined range, e.g., 300 m, based on inputted data from the navigator 11 and sends the road geometry data to the $1^{st}$ (first) road data detector 6.

The road geometry data include the position (Xn, Yn) of a representative node Pn; distance Ln between node Pn−1 and node Pn; radius of curvature Rn; curve center On; curve angle θn obtained from an angle formed by lines Pn−1 Pn and Pn Pn+1; a distance between node P−1 and curve starting point Lsn (the intersection point of line Pn−1 Pn and a perpendicular line from the curve center On to line Pn−1 Pn); and distance Lssn from the vehicle position to representative node Pn.

As shown in FIG. 2, the road geometry detector 5 mainly consists of a node detector 9a, a Pn−1 Pn distance calculator 9b, a Pn Pn+1 distance calculator 9c, a relative length judgment 9d, a mid-point calculator 9e, a mid-point-same-distance-point calculator 9f, a radius calculator 9g and a corrector 9h.

Figure 5:
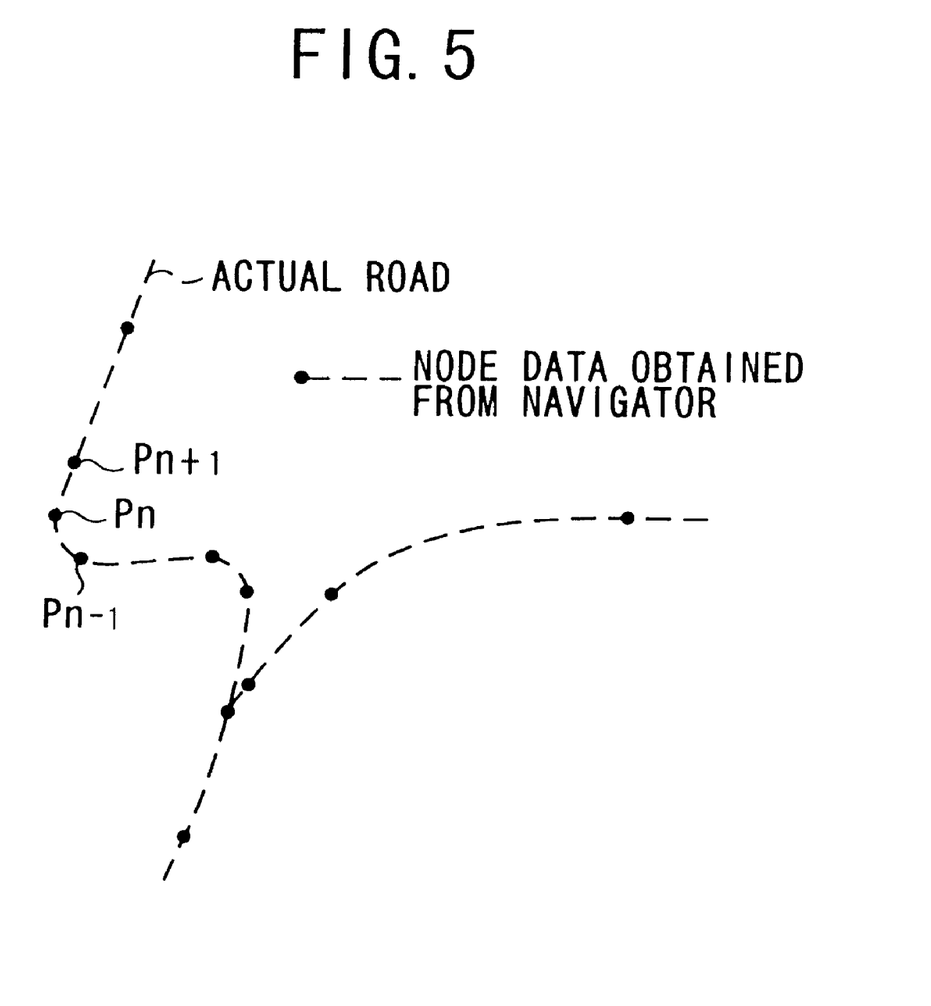
FIG. 5 is an illustration showing examples of node data actually obtained from a navigator.

As shown in FIG. 5, out of the node data inputted from the navigator 11, the node detector 9a registers three consecutive nodes in the traveling direction of the vehicle or on the road selected by the driver, and names them the 1$^{st}$ (first) node Pn−1, the 2$^{nd}$ (second) node Pn and the 3$^{rd}$ (third) node Pn+1, in turn from the closest. From the registered three nodes, the positional information of the 1$^{st}$ (first) and 2$^{nd}$ (second) nodes, Pn−1 and Pn are outputted to the Pn−1 Pn distance calculator 9b, and the positional information of the 2$^{nd}$ (second) and 3$^{rd}$ (third) nodes, Pn and Pn+1, are outputted to the Pn Pn+1 distance calculator 9c. Positional data of Pn−1, Pn and Pn+1 are (Xn−1,Yn−1), (Xn, Yn) and (Xn+1, Yn+1), respectively. Pn is the representative node of them. The curve data at points P1, P2, . . . , and Pn are calculated by the node combinations of (P0, P1, P2), (P1, P2, P3), . . . and (Pn−1, Pn, Pn+1), respectively.

The Pn−1 Pn distance calculator 9b calculates a straight distance from Pn−1 to Pn according to the positional information of Pn−1 and Pn inputted from the node detector 9a, and sends the distance datum to the relative length judgment 9d and the corrector 9h.

The Pn Pn+1 distance calculator 9c calculates a straight distance from Pn to Pn+1 according to the positional information of Pn and Pn+1 inputted from the node detector 9a, and sends the distance datum to the relative length judgment 9d and the corrector 9h.

The relative length judgment 9d compares the straight distance from Pn−1 to Pn, inputted from the Pn−1 Pn distance calculator 9b, and the straight distance from Pn to Pn+1, inputted from the Pn Pn+1 distance calculator 9c, so as to judge relative length.

Data (position, distance) of the shorter straight distance are sent to the mid-point calculator 9e and the corrector 9h, while data (position, distance) of the longer straight distance are sent to the mid-point-same-distance-point calculator 9f.

When the comparison at the relative length judgment 9d shows equal lengths for both straight distances, either one can be used, and the straight line connecting Pn−1 and Pn is regarded as the shorter straight line in this embodiment. (The straight line connecting Pn and Pn+1 also may be regarded as the shorter straight line in this instance).

An explanation will follow for the case when the straight line connecting Pn−1 Pn is shorter than the straight line connecting Pn and Pn+1.

According to the data (position, distance) of the shorter straight line inputted from the relative length judgment 9d, the mid-point calculator 9e calculates half of the shorter straight distance and determines the mid point position on the shorter straight line.

Here, the mid point of the shorter straight line connecting Pn−1 and Pn is named Pn−1,n of which coordinates are represented by (Xn−1,n, Yn−1,n).

$$Pn-1,n=(Xn-1,n,Yn-1,n)=((Xn-1+Xn)/2,(Yn-1+Yn)/2)$$

The data calculated by the mid-point calculator 9e are sent to the mid-point-same-distance-point calculator 9f and the radius calculator 9g.

According to the data (position, distance) of the longer straight line inputted from the relative length judgment 9d and half of the shorter straight line distance inputted from the mid-point calculator 9e, the mid-point-same-distance-point calculator 9f determines a mid-point-same-distance-point on the longer straight line at the position of half the distance of the shorter straight line from the 2$^{nd}$ node Pn.

Here, the mid-point-same-distance-point of the longer straight line connecting Pn and Pn+1 is named Pn,n+1, of which coordinates are represented by (Xn,n+1, Yn,n+1).

$$Pn,n+1=Pn+PnPn,n+1=(Xn,Yn)+K2(Xn+1-Xn,Yn+1-Yn)=(Xn,n+1, Yn,n+1)$$

where, $K2=((Xn-Xn-1)^2+(Xn-Yn-1)^2)^{1/2}/(2((Xn+1-Xn)^2+(Yn+1-Yn)^2)^{1/2})$

The positional data of the mid-point-same-distance-point Pn,n+1 calculated by the mid-point-same-distance-point calculator 9f are sent to the radius calculator 9g.

Figure 3:
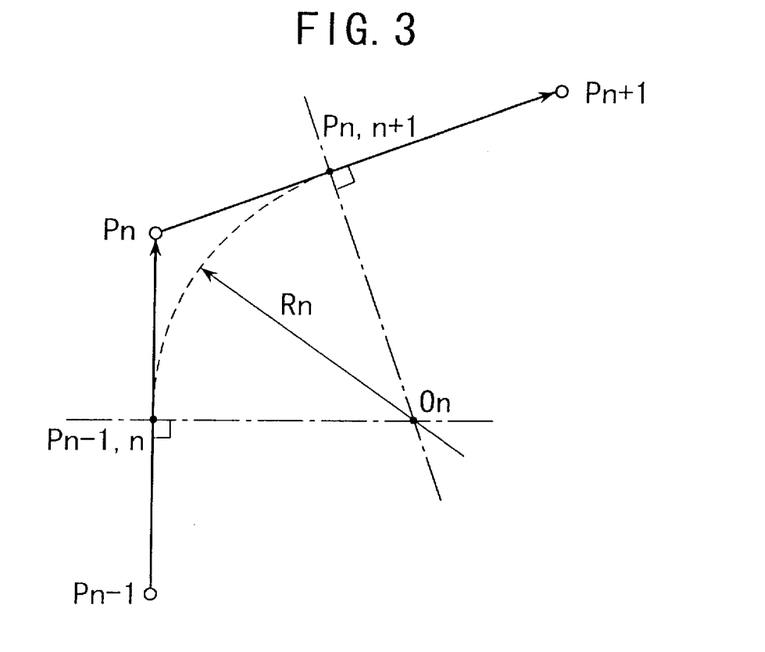
FIG. 3 is an illustration showing how to determine the radius of curvature of a curve.

According to the positional data of the mid-point Pn−1,n inputted from the mid point calculator 9e and the positional data of a mid-point-same-distance-point Pn,n+1 calculated by the mid-point-same-distance-point calculator 9f, the radius calculator 9g, as shown in FIG. 3, determines the center "On" of the emerging curve on the road by creating the crossing point of a line that lies at a right angle to the shorter straight line (here, Pn−1 Pn) at the mid-point Pn−1,n and a line that lies at a right angle to the longer straight line (here, Pn Pn+1) at the mid-point-same-distance-point Pn,n+1. Then, the radius calculator 9g calculates the radius of curvature Rn of the curve. The calculation results are sent to the corrector 9h, and are determined as follows:

$$On=Pn-1,n+Pn-1,n \; On=(Xn-1,n,Yn-1,n)+ M(Yn-Yn-1,Xn-1-Xn) \quad (1)$$

$$On=Pn,n+1+Pn,n+1On=(Xn,n+1,Yn,n+1)+N(Yn+1-Yn,Xn-Xn+1) \quad (2)$$

Therefore, $$Xn-1,n+M(Yn-Yn-1)=Xn,n+1+N(Yn+1-Yn) \quad (3)$$

$$Yn-1,n+M(Xn-1-Xn)=Yn,n+1+N(Xn-Xn+1) \quad (4)$$

Elimination of M from both formulas (3) and (4) allows one to obtain N as shown below:

$$N=((Xn-1-Xn)(Xn-1,n-Xn,n+1)+(Yn-1-Yn)(Yn-1,n-Yn,n+1))/ (Xn-1 \cdot Yn+1-Xn+1 \cdot Yn-1-Xn-1 \cdot Yn+Xn \cdot Yn-1-Xn \cdot Yn+1+Xn+1 \cdot Yn) \quad (5)$$

The position of curve center "On" is:

$$On=(Xon,Yon)=(Xn,n+1+N \cdot Yn+1-N \cdot Yn,Yn,n+1+N \cdot Xn-N \cdot Xn+1) \quad (6)$$

Therefore, the radius of curvature Rn is obtained from the following formula:

$$Rn=((Xn-Xn-1)(Yn+1-Yn)-(Xn+1-Xn)(Yn-Yn-1))/|((Xn-Xn-1)(Yn+1-Yn)-(Xn+1-Xn)(Yn-Yn-1))| \cdot ((Xon-Xn-1,n)^2+(Yon-Yn-1,n)^2)^{1/2} \quad (7)$$

Here, a positive figure for the radius of curvature Rn means a left turn and a negative figure means a right turn.

The distance Lon from curve center On to the representative node of the curve, i.e., the 2$^{nd}$ node Pn, is obtained from the following formula (8):

$$Lon=((Xon-Xn)^2+(Yon-Yn)^2)^{1/2} \quad (8)$$

The corrector 9h calculates the difference Deln between radius of curvature Rn, obtained by the radius calculator 9g, and distance Lon from curve center On to the 2$^{nd}$ node Pn. When the difference Deln exceeds a given error value (to be mentioned later), the corrector 9h corrects the radius of curvature Rn so that the difference Deln becomes smaller than the given error value.

Road geometry data for each representative node Pn, which have been corrected by the corrector 9h or left intact because of the difference Deln being smaller than the given error value, are stored.

Here, the road data for representative node Pn include the position (Xn, Yn) of representative node Pn; distance Ln between node Pn−1 and node Pn; radius of curvature Rn; curve center On; curve angle θn obtained from an angle formed by lines Pn−1 Pn and Pn Pn+1; a distance between node Pn−1 and curve starting point Lsn (the intersection point of the Pn−1 Pn line and a perpendicular line from curve center On to line Pn−1 Pn); and a distance Lssn from the vehicle position to representative node Pn.

The given error value depends on the road width data from the navigator 11 (road width D) and the shorter straight line distance judged by the relative length judgment 9d, thereby being represented as αD. (Here, α is a constant to be set in accordance with the shorter straight line distance, hereinafter referred to as a "node interval correction factor.") The wider the road width D, the bigger the given error value, resulting in less possibility of correction. That is to represent a reality that when a road width is wider, the radius of curvature is larger.

As with the node interval correction factor α, the shorter the straight line distance, the larger the node interval correction factor α, resulting in less possibility of correction. For example, when the shorter straight line distance is shorter than 20 m, α is 1.2, when the shorter straight line distance is between 20 m and 100 m, α is 0.6, and when the shorter straight line distance is longer than 100 m, α is 0.3. Short intervals of nodes represent that the road is accurately drawn by nodes on the map, i.e., less correction is necessary.

Figure 4:
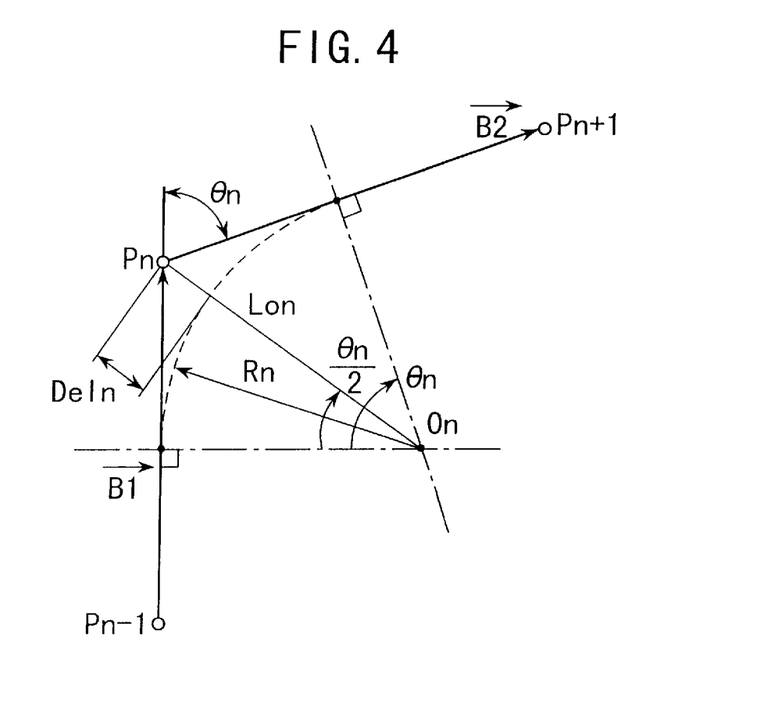
FIG. 4 is an illustration showing how to correct the obtained radius of curvature of the emerging curve.

FIG. 4 shows a detailed correction to be made by the corrector 9h. The vector from Pn−1 to Pn is denoted by B1, and the vector from Pn to Pn+1 is denoted by B2.

$$B1=(Xn-Xn-1,Yn-Yn-1)=(Xb1,Yb1)$$

$$B2=(Xn+1-Xn,Yn+1-Yn)=(Xb2,Yb2)$$

An angle θn formed by B1 and B2 is as follows:

$$\cos \theta n=(Xb1 \cdot Xb2+Yb1 \cdot Yb2)/(|B1| \cdot |B2|)$$

Error ratio Pdeln between Lon and Rn is as follows:

$$Pdeln=Rn/Lon=\cos(\theta n/2)=((\cos\theta n+1)/2)^{1/2} \quad (9)$$

Therefore, the difference Deln between Lon and Rn is as follows:

$$Deln=Lon-|Rn|=Lon(1-Pdeln)=Lon(1-(\cos\theta n+1)/2)^{1/2}) \quad (10)$$

In this connection, when the difference Deln exceeds the given error value (αD), radius of curvature Rn is corrected so that Deln becomes equal to αD. Specifically:

$$Lon=Deln/(1-((\cos\theta n+1)/2)^{1/2})=\alpha D/(1-((\cos\theta n+1)/2)^{1/2})=\alpha D/(1-((Xb1 \cdot Xb2+Yb1 \cdot Yb2)+|B1| \cdot |B2|)/(2|B1| \cdot |B2|))^{1/2})$$

$$Rn=Lon \cdot Pdeln=\alpha D/(1-((\cos\theta n+1)/2)^{1/2}) \cdot ((\cos\theta n+1)/2)^{1/}$$

$$=\alpha D/((2/(\cos\theta n+1))^{1/2}-1)$$

$$=\alpha D/((2|B1ve| \cdot |B2ve|/(Xb1 \cdot Xb2+Yb1 \cdot Yb2+|B1ve| \cdot |B2ve|))^{1/2}-1) \quad (11)$$

Because road geometry data are obtained from the road geometry detector 5 as described above, data of the nodes even with irregular intervals can be used as they are. Thus, the radius of curvature of a road to be traveled on can be determined quickly and accurately by simple calculation without data supplement or complex calculations.

The continuity of radiuses of curvature determined for respective nodes are natural, and the obtained data represent accurately an actual road geometry.

Further, when possible calculation errors occur, the calculated radius of curvature always becomes smaller than the actual radius of curvature. This is preferable because it allows the warning/speed down control to make a proper warning when approaching a curve.

By providing the corrector 9h for the radius of curvature, it is possible to calculate the radius of curvature accurately. Furthermore, because the system allows the given error value to vary depending on actual road widths and node intervals, the calculations can be more accurate.

In other words, in order to represent a reality that when a road width is wider, the radius of curvature is larger, the system is set so that when the road width D is wider, the given error value is larger, resulting in less possibility of correction. In order to reflect the fact that short intervals of nodes represent that the road is accurately drawn by nodes on the map, the system is set so that the shorter the straight line distance, the larger the node interval correction factor α, resulting in less possibility of correction.

The road geometry data detected by the road geometry detector 5 are sent to the $1^{st}$ (first) road data detector 6. The $1^{st}$ (first) road data detector 6 picks out road geometry data for the nearest curve and calculates L1, a distance to the curve, e.g., a distance from the vehicle to the node representing the curve. The $1^{st}$ (first) road data detector set (i.e., the $1^{st}$ road data I1) comprises at least L1, which is the calculated distance to the curve, R1, which is the radius of curvature of the curve and the road width W1.

The $2^{nd}$ (second) road data detecting means consists of the camera 12 and the $2^{nd}$ (second) road data detector 7. The $2^{nd}$ (second) road data detector 7 receives a pair of stereo images from in front of the car from the camera 12. The $2^{nd}$ (second) road data detector determines distance data over the entire image field by way of trigonometric calculations according to the deflections of the positions of objects in each respective image, so as to generate a 3D-image showing distances, and recognizes the road being traveled on by carrying out a histogram processing of the distance distributions of the 3D-images. Thus the $2^{nd}$ (second) road data detector sends the $2^{nd}$ (second) road data, which represents the recognized road, to the road data determiner 8.

When recognizing that the road has a curve in front of the vehicle, the $2^{nd}$ (second) road data detector 7 manages the curve with $2^{nd}$ (second) road data I2 comprising at least L2, which is a distance to the curve, R2 which is the radius of curvature of the curve and the road width W2.

R2, the radius of curvature of the curve, is designated in six rankings in this embodiment, for example, as follows:
 R2=1: Right curve almost straight (R2<−200 m)
 R2=2: Mild right curve (−200 m<R2<−100 m)
 R2=3: Tight right curve (−100 m<R2<0 m)
 R2=4: Tight left curve (0 m<R2<100 m)
 R2=5: Mild left curve (100 m<R2<200 m)
 R2=6: Left curve almost straight (200 m<R2)
R2, the radius of curvature of the curve, may be expressed in actual figures when it is detectable precisely.

The road data determiner 8, i.e., road data determining means, receives the $1^{st}$ (first) road data I1 and the $2^{nd}$ (second) road data I2 from the $1^{st}$ (first) road data detector 6 and the $2^{nd}$ (second) road data detector 7, respectively. The road data determiner 8 determines the final road data I based on the $1^{st}$ and $2^{nd}$ road data I1 and I2, and sends the final road data to the vehicle dynamic control value calculator 4.

Firstly, the road data determiner 8 judges whether the $2^{nd}$ (second) road data I2 is valid or not. Cases of invalidity are found when consideration of L2 reaches a judgment that there is no curve in front of the vehicle and when L2 and/or R2 change drastically at a calculation cycle. When the numbers do not return within a predetermined number of calculation cycles (e.g., 3 cycles) after the change occurs, the road data is judged invalid. During the predetermined number of cycles, the $2^{nd}$ (second) road data I2 detected just before the change occurred is used.

When the $2^{nd}$ (second) road data I2 is valid and when L1 and R1 of the $1^{st}$ (first) road data I1 and L2 and R2 of the $2^{nd}$ (second) road data I2 are regarded as the same (within predetermined ranges), the road data determiner 8 determines the road data I, which consists of the distance L to the curve, the radius of curvature R of the curve and the road width W.

The distance L, the radius of curvature R and the road width W are determined by taking averages of L1 and L2, R1 and R2 and W1 and W2. Determination of this data is not limited to the above methods. The larger values may be employed. Also, the more precise data out of the $1^{st}$ road data and the $2^{nd}$ road data may be employed considering the preciseness of the road map data of the navigator 11 and the detection preciseness of the camera 12.

At the establishment of the final road data I, accord in the road widths W1 and W2 within a predetermined range may be used in addition to the comparisons of L1 and L2 and R1 and R2.

The road data determiner 8 does not establish the road data I when discord is observed in either of L1/L2 and R1/R2. Then the road data determiner 8 establishes a discord flag, showing no establishment of road data I and sends a discord signal to the vehicle dynamic control value calculator 4, the $1^{st}$ (first) road data detector 6 and the discord warning sender 10.

The road data determiner 8 establishes road data I by taking the $1^{st}$ (first) road data I1, when the $2^{nd}$ (second) road data I2 are invalid.

When the discord warning sender 10 receives the discord signal from the road data determiner 8, the discord sender 10 sends a discord warning signal so that the warning device 14 sends a discord warning which informs the driver that no road data is recognized. The discord warning is different from a warning to urge the driver to carry out braking.

Thus the road data recognizer 3 can exactly recognize road data of the running route in front of the vehicle because the road data recognizer 3 determines road data I while comparing the $1^{st}$ (first) road data I1 which are formed based on data inputted from the navigator 11 and the $2^{nd}$ (second) road data I2 which are formed based on data inputted from the camera 12. Namely, a road data detection limit of the navigator 11 can be supplemented. When there are differences between the stored data in the navigator 11 and the actual road conditions, because road construction is being done or the road has been changed, it can be recognized that data from the navigator 11 are erroneous.

The road data recognizer 3 can obtain road data securely overcoming difficulty due to bad weather or abrupt changes of running conditions, because the road data recognizer 3 determines road data I based on only the $1^{st}$ (first) road data I1 when the $2^{nd}$ (second) road data I2 is invalid.

The road data recognizer 3 does not establish road data I when the $1^{st}$ (first) road data and the $2^{nd}$ (second) road data do not fulfill predetermined conditions. Thus recognition of erroneous road data can be avoided, and an erroneous control because of erroneous road data can be prevented.

The vehicle dynamic control value calculator 4 calculates an aimed deceleration "At" based on inputted data from the road recognizer 3 and various signals representing vehicle running conditions, and makes warning control signals considering the actual deceleration of the vehicle against the aimed deceleration At. The signals are sent to the warning device 14, such as a buzzer, voice warning, warning light, to urge the driver to carry out vehicle control.

Further, in the case when the actual deceleration is smaller than the aimed deceleration At and forced deceleration is required, the vehicle dynamic control value calculator 4 sends a vehicle movement control (speed down control) signal to the vehicle movement controller 15 to carry out transmission shift down, engine turbo-charging pressure reduction, fuel cut, complete throttle closing, braking application or increasing of braking force.

The vehicle dynamic control value calculator 4 calculates aimed deceleration At for the following four cases according to the situation of the discord flag to be established by the road data recognizer 3.

Case 1—Discord flag is not established and the predetermined calculation cycles have passed since resetting of a previous discord flag.

Case 1 represents the following situations:
road data I is continually determined based on only $1^{st}$ (first) road data I1 from the
navigator 11 if invalid $2^{nd}$ (second) road data I2 from the camera 12 is obtained, or road
data I is continually determined based on both road data I1 and I2 after a term mentioned
later in case 4 has passed because the $2^{nd}$ (second) road data I2 are valid and in accord
with the $1^{st}$ (first) road data I1.

In this case, the vehicle dynamic control value calculator 4 determines an allowable lateral acceleration for the vehicle depending on road surface conditions such as friction $\mu$. Then an allowable approaching speed V1, with which the vehicle can pass the curve safely, is determined based on the allowable lateral acceleration and the radius of curvature R of the road data I inputted from the road data determiner 8.

The vehicle dynamic control value calculator 4 calculates a required deceleration "An", with which the vehicle can reduce the current speed V at a constant deceleration to V1 when reaching the curve entrance, by the following equation, based on the distance L to the curve, current vehicle speed V and the allowable approaching speed V1:

$$V^2 - V1^2 = 2AnL \tag{12}$$

Then, the required deceleration An is employed as the aimed deceleration At.

Case 2—Discord flag is established and the predetermined number of cycles have not passed since establishment of the discord flag.

Case 2 represents a situation just after $1^{st}$ (first) road data I1 from the navigator 11 is in
discord with $2^{nd}$ road data I2 from the camera 12.

The vehicle dynamic control value calculator 4 corrects the aimed deceleration At determined in the situation of case 1 just before the establishment of the discord flag so that the At reduces cycle by cycle to 0 (zero) at the end of the predetermined calculation cycles, judging that it is impossible to carry out warning control by the warning device and vehicle movement control (speed down control) by the vehicle movement controller according to road data I.

During the correction, the warning control and the vehicle movement control are continued according to the corrected aimed deceleration At.

Case 3—Discord flag is established and the predetermined number of calculation cycles have passed since the establishment of the discord flag.

Case 3 represents a situation that $1^{st}$ road data I1 from the navigator 11 continuously discords with $2^{nd}$ road data I2 from the camera 12 after the duration of case 2.

The vehicle dynamic control value calculator 4 determines the aimed deceleration At to be 0 (zero) so that warning control and vehicle movement control (speed down control) are prohibited.

Case 4—Discord flag is reset and a predetermined number of calculation cycles have not passed since the resetting of the discord flag.

Case 4 represents a situation just after starting of determining road data I by only $1^{st}$ road data I1, because of invalidity of $2^{nd}$ road data I2 from the camera 12, or just after starting of determining road data I based on both road data I1 and I2 because the $2^{nd}$ (second) road data I2 is valid and in accord with the $1^{st}$ (first) road data I1.

The vehicle dynamic control value calculator 4 receives road data I. In such a case just after the discord flag is reset, required deceleration An determined based on the inputted road data I is sometimes quite different from the aimed deceleration At determined just before the discord flag is reset.

The vehicle dynamic control value calculator 4 corrects the aimed deceleration At determined in the preceding cycle by increasing it for a predetermined number of cycles gradually to the required deceleration An determined based on the road data I. Then the new aimed deceleration At is determined to be the corrected aimed deceleration At.

The correction value for the aimed deceleration At determined at the precedent calculation cycle is calculated by the following formula:

Correction value=(At–An)/(Ncp–Nar)

At: aimed deceleration determined at precedent calculation cycle

An: required deceleration determined at present calculation cycle

Ncp: predetermined number of calculation cycles

Nar: calculation cycles lapsed since discord flag was reset

The vehicle dynamic control value calculator 4 manages the warning control signal and the vehicle movement control signal based on the corrected aimed deceleration At and the actual deceleration so that warning and vehicle movement controls can be carried out if necessary.

The warning control signal is prepared when the driver decelerates with less than the aimed deceleration At, and it is sent to the warning control device 14 so that a prepared warning is carried out to urge the driver to use more deceleration corresponding to the aimed deceleration At.

The vehicle movement control signal is prepared when the driver decelerates with less than the aimed deceleration At, and it is sent to the vehicle movement controller 15 so that a prepared vehicle movement control (speed down control) is carried out corresponding to the aimed deceleration At.

Figure 6:
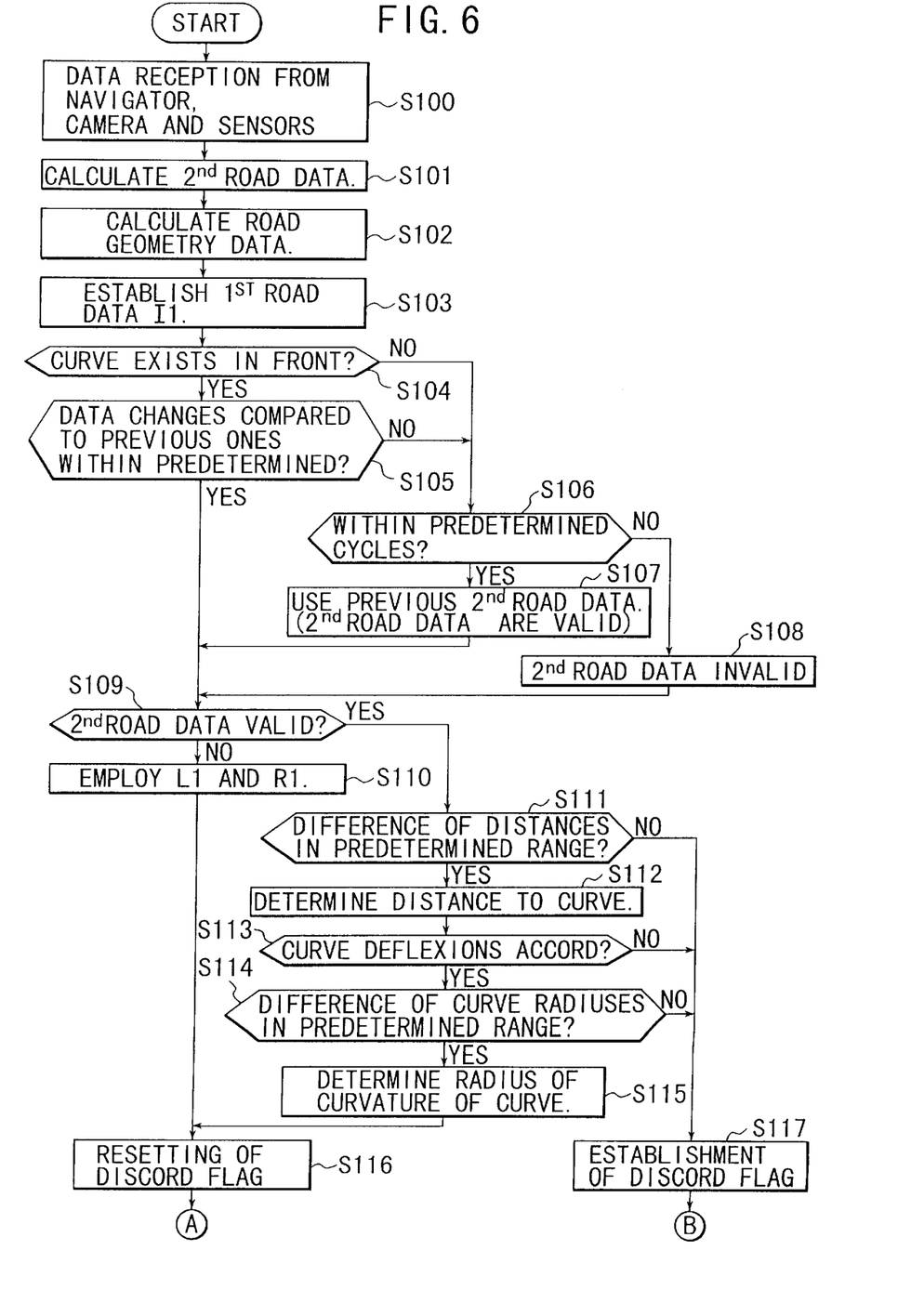
FIG. 6 is a flow chart showing vehicle dynamic control using a road data recognizing device according to the present invention.
Figure 7:
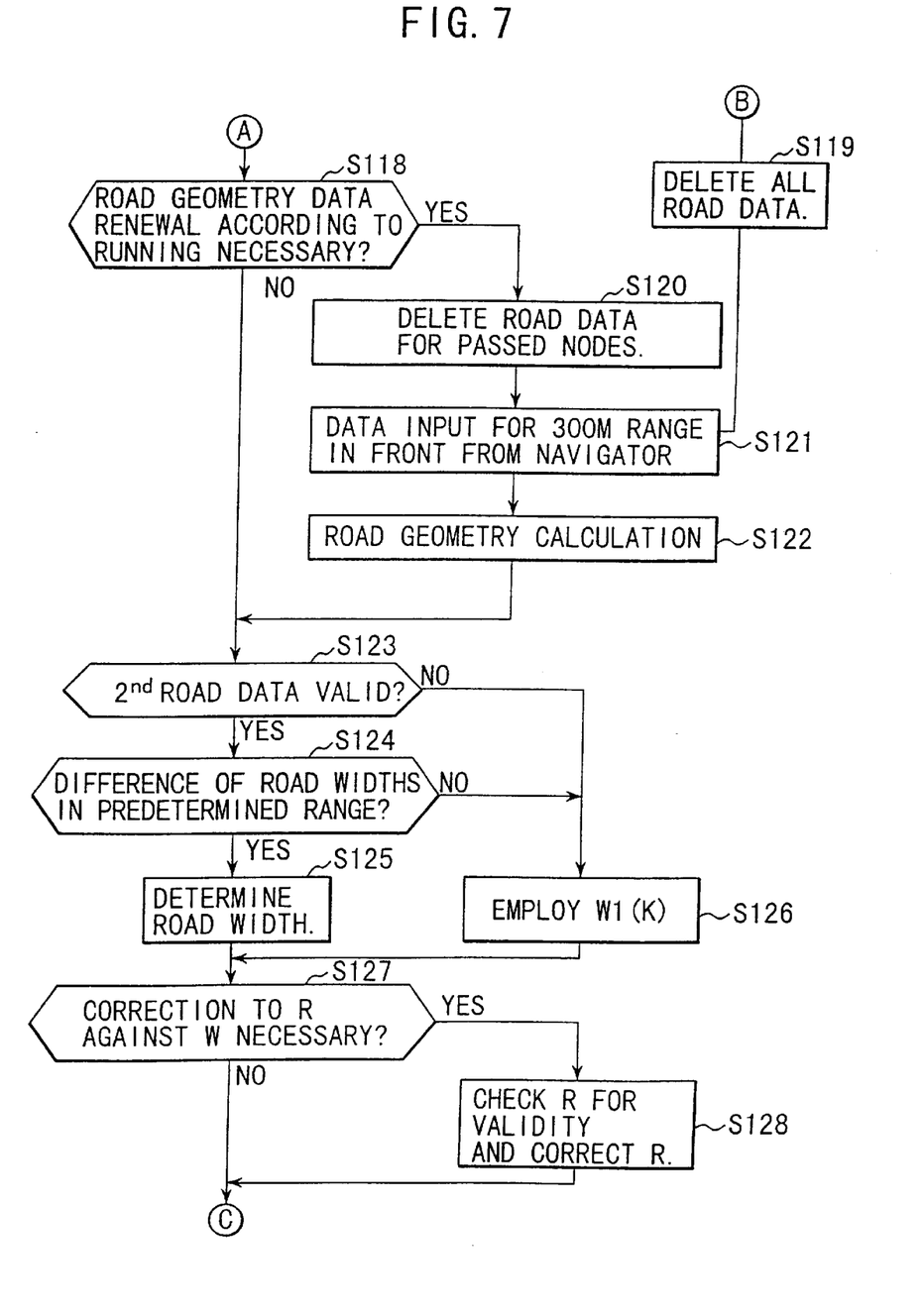
FIG. 7 is a flow chart showing vehicle dynamic control using a road data recognizing device according to the present invention (continued from FIG. 6)
Figure 8:
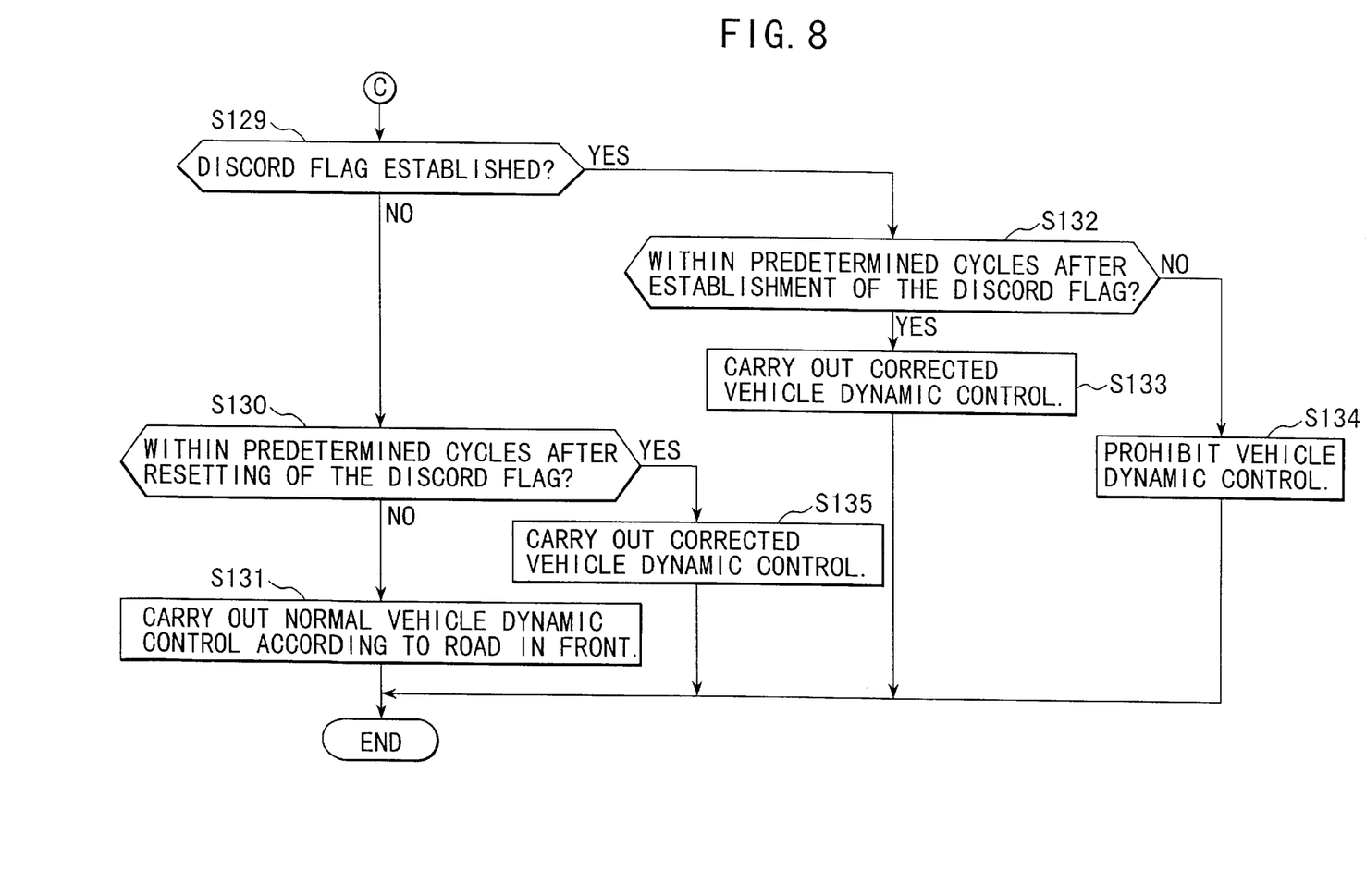
FIG. 8 is a flow chart showing vehicle dynamic control using a road data recognizing device according to the present invention (continued from FIG. 7).

Operations to be carried out by the controller 2 having the road data recognizer 3 according to the present invention are explained, referring to the flow charts shown in FIG. 6 through FIG. 8. This program is to be carried out every 0.1 second.

At Step (hereinafter abbreviated to "S") 100, the controller 2 receives data from the navigator 11, the camera 12, the vehicle speed sensor 13, and other respective sensors (not shown). Then the program goes to S101.

At S101, the $2^{nd}$ (second) road data detector 7 detects road information in front of the vehicle by distance data processing and histogram processing. When the road has a curve, $2^{nd}$ road data I2 including at least the distance L2 from the vehicle to the curve, the radius of curvature R and the road width W are calculated.

Following S101, S102 is carried out. At S102, the road geometry detector 5 calculates road geometry data at each node based on vehicle position data and node data inputted from the navigator 11. Then the program goes to S103.

At S103, the $1^{st}$ (first) road data detector 6 picks out road geometry data for the nearest curve from the road data for each node calculated at S102, and calculates a distance to the curve L1, from the vehicle position to the node representing the curve. The $1^{st}$ (first) road data detector establishes $1^{st}$ road data I1 consisting of R1, which is the radius of curvature of the curve and road width W1, as well as L1, which is the calculated distance to the curve.

S104 through S107 are operations by the road data determiner 8. The road data determiner 8 receives the $1^{st}$ (first) road data I1 stored in the $1^{st}$ (first) road data detector 6, the $2^{nd}$ (second) road data I2 detected by the $2^{nd}$ (second) road data detector 7 at S102, vehicle position from the navigator 11 and vehicle speed V from the vehicle speed sensor 13.

At S104, it is judged whether there is any curve in front of the vehicle on the road recognized by the $2^{nd}$ (second) road data detector, i.e., the distance to the curve L2 of the $2^{nd}$ (second) road data I2 is checked. If yes, the program goes to S105. If not, the program goes to S106.

At S105, changes in the values of L2 and R2 are determined at the present calculation cycle as compared to the preceding calculation cycle. It is judged whether the value changes are within predetermined values. Namely, the detected data are judged if they are reliable without dropping and variation due to noise. If L2 (distance to the curve) and R2 (radius of curvature of the curve) detected at the present cycle do not differ from those detected at the preceding cycle beyond predetermined values, it is judged that they are reliable. After recognizing L2 (distance to the curve) and R2 (radius of curvature of the curve) as effective, the program goes to S109.

On the other hand, when either of the values of L2 and R2, compared to those detected at the preceding cycle, have changed beyond the predetermined values, it is judged that the data detected at the present cycle are not reliable at S105. The program then goes to S106.

The judgment on the reliability of L2 (distance to the curve) is done by using the following conditional formula:

$$|L2(k)-L2(k-1)|+Vt \leq 10m \tag{12}$$

L2(k): Distance to the curve detected at the present cycle

L2(k−1): Distance to the curve detected at the preceding cycle

V: Vehicle speed t: cycle interval, 0.1 second in this embodiment

Whether or not L2(k) and L2(k−1) fulfill the conditions of the formula is checked.

The judgment on reliability of R2 (radius of curvature of the curve) is done by checking whether or not a ranking difference between R2 detected at the present cycle and the previously detected R2 is one or more. The ranking of R2 is 1 to 6 as explained before.

By checking the reliability of L2 (distance to the curve) and R2 (radius of curvature of the curve) by comparison to those detected at the preceding cycle, erroneous data caused by a change of running conditions and weather can be excluded. It is possible to obtain reliable data only.

At S106, as a result of judgment at S104 that no curve exists or judgment at S105 that the $2^{nd}$ (second) road data I2 are not reliable, the system checks the number of cycles where the situation of no curve is found to be in existence or where the $2^{nd}$ road data I2 is found unreliable. If the number of the cycles is outside a predetermined number, e.g., 3, the program goes to S108, and then the $2^{nd}$ road data I2 is judged as invalid at S108. The program then goes to S109.

On the other hand, when the number of the cycles is within a predetermined number, e.g., 3, the program goes to S107 where the previous $2^{nd}$ (second) road data I2 is taken for the present $2^{nd}$ (second) road data I2 and the $2^{nd}$ (second) road data I2 is judged valid. Then the program goes to S109.

At S109, the system checks whether or not the $2^{nd}$ (second) road data I2 are judged valid. If the $2^{nd}$ (second) road data I2 are invalid, the program goes to S110. At S110, L1 (distance to the curve) and R1 (radius of curvature of the curve) based on the $1^{st}$ (first) road data I1 are employed for the distance L and the radius R of the final road data I, and the system then goes to S116.

Even when the $2^{nd}$ (second) road data I2 are invalid, the distance L to the curve and the radius of curvature R of the curve are established based on the $1^{st}$ (first) road data I1. Namely, when the $2^{nd}$ (second) road data I2 are not obtained due to bad running conditions or weather, the distance L to the curve and the radius of curvature R of the curve still can be established.

When the $2^{nd}$ (second) road data I2 are valid, the program goes to S111. At S111, L1 and L2 are compared. If the difference of L1 and L2 is within a predetermined range, e.g., 20 m, the program goes to S112.

At S112, the distance L to the curve of the final road data I is determined based on L1 and L2, and the system then goes to S113.

The distance L to the curve is calculated by the following formula:

$$L=(L1+L2)/2 \quad (13)$$

L also may be set by taking the larger of L1 and L2.

At S113, the system checks whether or not deflexion angles determined by the $1^{st}$ (first) road data detector 6 and the $2^{nd}$ (second) road data detector 7 are in accordance with each other. If yes, the system then goes to S114. At S114, the system checks whether radiuses R1 and R2 accord with each other within a predetermined range. If yes, then the system goes to S115.

At S114, if the relations between R1 and R2 are one of the following conditions, it is judged that R1 and R2 are in accord with each other. In other cases, it is judged that R1 and R2 discord.

$R1<-150$ m, and $R2=1$
$-250$ m$<R1<-50$ m, and $R2=2$
$-150$ m$<R1<0$ m, and $R2=3$
$0$ m$<R1<150$ m, and $R2=4$
$50$ m$<R1<250$ m, and $R2=5$
$150$ m$<R1$, and $R2=6$ At S115, the radius R is set for the final road data I based on R1 and R2, and the system then goes to S116.

Here, R is obtained, for example, from an average of R1 and R2. Alternatively, the larger of R1 and R2 can be taken for R.

When the $2^{nd}$ (second) road data I2 are valid, the distance L and radius R are determined based on the $2^{nd}$ (second) road data I2 and the $1^{st}$ (first) road data I1 so that reliable data can be obtained.

At S116, as a result of the establishment of L and R for the final road data I at S110 or at S115, the program goes to S116. At S116, the discord flag is reset, and the system then goes to S118.

At S117, as a result of judgment at S111 that the difference between L1 and L2 is beyond the predetermined range, judgment at S113 that the deflexion angles discord, or judgment at S114 that R1 and R2 do not accord with each other within the predetermined range, a discord flag is established, representing a discord of the $1^{st}$ (first) road data I1 based on the navigator 11 and the $2^{nd}$ (second) road data I2 based on the camera 12. A discord signal showing establishment of the discord flag is sent to the vehicle dynamic control value calculator 4, the $1^{st}$ (first) road data detector 6, and the discord warning sender 10. Then, the program goes to S119.

The discord warning sender 10 dispatches a discord warning to inform the driver of discord of the $1^{st}$ (first) road data I1 and the $2^{nd}$ (second) road data I2 through the warning device 14, upon receipt of the discord signal.

Thus, by giving the discord warning to driver, the driver is advised that there is a possibility that erroneous road geometry is stored in the navigator 11 due to road construction or modification of the road, or the camera 12 can not take exact image information, which may alert the driver of the need to proceed with care.

S118 through S122 are for the road geometry detector 5. When proceeding to S118 from S116, it is checked whether renewal of the road geometry data is necessary at S118.

At S118, it is checked if the first node of node data newly inputted from the navigator 11 accords with the $2^{nd}$ or after node Pk ($k \ne 1$, $K=2, 3, 4, \ldots$) previously stored. Then it is judged if data renewal is necessary or not.

When the first node data newly inputted from the navigator 11 accords with the first node P1 currently stored, it is judged that renewal is not necessary. Currently stored data are left as they are, and the system then goes to S123.

When the first node data newly inputted from the navigator 11 accords with the second or after node Pk previously stored, the vehicle has passed nodes P1 through Pk−1, and it is judged that data renewal is necessary. Then the program goes to S120.

At S120, road geometry data relating to the nodes P1 through Pk−1 are deleted, and the system then goes to S121. However, data of the curve represented by the node Pk−1, i.e., half of the curve length, radius of curvature Rk−1 and road width Wk−1, are not deleted because the curve still continues after the vehicle passes the node Pk.

At S121, the numbers of the road geometry data after the data deletion and the numbers of node data inputted from the navigator 11 are compared so that the system can judge whether the inputted data from the navigator include new nodes or not. If yes, those new nodes are picked out, and the system then goes to S122.

At S122, road geometry data relating to the new nodes newly picked out are calculated, and the system then goes to S123.

The road geometry data include the position (Xn, Yn) of representative node Pn; distance Ln between node Pn−1 and node Pn; radius of curvature Rn; curve center On; curve angle θn obtained from an angle formed by lines Pn−1 Pn and Pn Pn+1; a distance between node Pn−1 and the curve starting point Lsn (the intersection point of the line Pn−1 Pn and the line perpendicular from curve center On to the line Pn−1 Pn); and the distance Lssn from the vehicle position to representative node Pn.

At S119, as a result of establishment of a discord flag, all of the road geometry data are deleted, and the system then goes to S121. At S121, all data inputted from the navigator 11 are picked out as new data.

S123 through S128 are for the road data determiner 8. At S123, the $2^{nd}$ (second) road data I2 is checked for validity and if valid, the system then goes to S124.

At S124, it is checked whether a difference between the road width W1 of the $1^{st}$ (first) road data I1 determined at S103 and the road width W2 of the $2^{nd}$ (second) road data I2 determined at S101 is within a predetermined range. If they accord with each other, the system then goes to S125, where the road width W is determined based on W1 and W2. Then the program goes to S127.

As for the judgment of accordance of the road widths W1 and W2, if W1 and W2 fall into one of the following four conditions, it is judged that W1 and W2 accord with each other:

W2<5 m, and W1=1
2 m<W2<10 m, and W1=2
5 m<W2<20 m, and W1=3
10 m<W2, and W1=4

If they fall outside of these conditions, it is judged they discord.

Road width W is determined as the average of W1 and W2.

At S126, as a result of a judgment at S123 that the $2^{nd}$ (second) road data I2 are invalid or judgment at S124 that W1 and W2 discord, the road width W is determined to be the value of W1. Then the program goes to S127.

At S127, it is judged whether the correction to the radius of curvature R determined at S110 or at S115 is necessary or not according to a determination of the road width W at S125 or at S126. If judged yes, the system then goes to S128.

At S128, it is checked if the radius R is reasonable given the road width W, and the radius R is corrected. Final road data I including the corrected radius R and the distance L determined at S110 or S112 are sent to the vehicle dynamic control value calculator 4, and then the program goes to S129

When it is judged at S127 that correction to the radius R is not necessary, final road data I including the radius R as it is and distance L are sent to the vehicle dynamic control value calculator 4, and then the program goes to S129.

S129 through S134 are for the vehicle dynamic control value calculator 4. At S129, it is judged whether the discord flag is established. If yes, the system then goes to S132. If not, i.e., the discord flag has been reset, the system goes to S130.

At S132, it is judged whether the number of calculation cycles after establishment of the discord flag is within a predetermined number or not. If yes, i.e., within the predetermined number, the system goes to S133. If not, i.e., beyond the predetermined number, the system goes to S134.

At S130, it is judged whether the number of calculation cycles after resetting of the discord flag is within a predetermined number. If yes, i.e., within the predetermined number, the system goes to S135. If not, i.e., beyond the predetermined number, the system goes to S131.

When the program reaches S131, having passed through S129 and S130, the discord flag has been reset and cycles more than the predetermined number have passed since the resetting of the discord flag. At S131, the aimed deceleration At is determined based on the road data I, and the warning control signal and the vehicle movement control signal are calculated, and then the program goes to an end.

When the program reaches S133, having passed through S129 and S132, the discord flag has been established and cycles more than the predetermined number have not passed since the establishment of the discord flag. At S133, aimed deceleration At is determined by correction to reduce gradually the previously determined At to 0 (zero), and the warning control signal and the vehicle movement control signal are calculated according to the determined At, and then the program goes to an end.

When the program reaches S134, having passed through S129 and S132, the discord flag has been established and cycles more than the predetermined number have passed since the establishment of the discord flag. At S134, aimed deceleration At is determined to be 0 (zero), and warning control and vehicle movement control are prohibited.

When the program reaches S135, having passed through S129 and S130, the discord flag has been reset and cycles more than the predetermined number have not passed since the resetting of the discord flag. At S135, aimed deceleration At is determined by correction to increase gradually the previously determined At, and the warning control signal and the vehicle movement control signal are calculated according to the determined At, and then the program goes to an end.

When the road data recognizer 3 judges that $1^{st}$ (first) road data I1 from the navigator 11 and $2^{nd}$ (second) road data I2 from the camera 12 discord, the vehicle dynamic control value calculator 4 reduces gradually the aimed deceleration At to 0 (zero) in the predetermined cycles so that the warning control and the vehicle dynamic control can be prohibited smoothly.

When the discordance of the $1^{st}$ and $2^{nd}$ road data are resolved and the warning control and the vehicle movement control are about to be resumed, aimed deceleration At is gradually increased so that they are resumed smoothly.

According to the present invention as explained above, vehicle dynamic control value calculation can be done even when road data are discontinuous so that smooth and natural vehicle dynamic control can be carried out.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An apparatus for controlling a vehicle based on road data, comprising:
   vehicle running condition detecting means for detecting running conditions of said vehicle;
   road data detecting means for detecting road data including a curvature of a traveling route in front of said vehicle;
   road data determining means for judging whether said road data is valid or invalid, and for determining that road data detection becomes unreliable when said road data is invalid for a predetermined time;
   vehicle dynamic control value calculating means for calculating vehicle dynamic control values based on running conditions and said road data when said road data is valid, and for calculating vehicle dynamic control values based on said running conditions and valid road data detected before said road data was determined as invalid for said predetermined time, and for stopping the calculation of said vehicle dynamic control values using said invalid road data when road data detection becomes unreliable; and
   vehicle movement control means for controlling said vehicle based on said vehicle dynamic control value.

2. The apparatus for controlling a vehicle according to claim 1, wherein said vehicle dynamic control value calculating means calculates at least an aimed deceleration of said vehicle.

3. The apparatus for controlling a vehicle according to claim 1, wherein said road data determining means judges that said road data is invalid when said road data change suddenly.

4. The apparatus for controlling a vehicle according to claim 1, wherein said road data determining means judges that said road data is invalid when said road data is unavailable.

5. An apparatus for controlling a vehicle based on road data, comprising:

vehicle running condition detection means for detecting running conditions of said vehicle;

first road data detecting means for detecting first road data of a traveling route in front of said vehicle based on road map data;

second road data detecting means for detecting second road data of a traveling route in front of said vehicle based on road conditions detected as said vehicle travels down the route;

road data determining means for determining final road data based on said first road data and said second road data when said first road data are about the same as said second road data;

vehicle dynamic control value calculating means for calculating vehicle dynamic control values based on said final road data; and vehicle movement control means for controlling said vehicle based on said vehicle dynamic control values.

6. The apparatus for controlling a vehicle according to claim 5, wherein said final road data includes at least a distance to a nearest curve.

7. The apparatus for controlling a vehicle according to claim 5, wherein said final road data includes at least a radius of curvature of a nearest curve.

8. The apparatus for controlling a vehicle according to claim 5, wherein said final road data includes at least a road width of a nearest curve.

9. The apparatus for controlling a vehicle according to claim 5, wherein said vehicle dynamic control value calculating means stops calculating said vehicle dynamic control values when said road data determining means judges that said first road data are different from said second road data.

10. The apparatus for controlling a vehicle according to claim 5, wherein said vehicle dynamic control value calculating means decreases gradually said vehicle dynamic control values so as to restrain an amount of control of said vehicle when said road data determining means judges that said first road data are different from said second road data.

11. The apparatus for controlling a vehicle according to claim 5, wherein, when said first road data are determined to be different from said second road data and then at a later time said first road data are determined to be about the same as said second road data, said vehicle dynamic control value calculating means increases gradually said vehicle dynamic control values up to values corresponding to said first or second road data detected at the later time.

12. The apparatus for controlling a vehicle according to claim 5, wherein said road data determining means judges whether said second road data is valid or invalid, and when invalid, said road data determining means determines that said second road data detected immediately before said second road data became invalid as the second road data for a predetermined time while said second road data are judged as invalid.

13. The apparatus for controlling a vehicle according to claim 12, wherein said road data determining means judges that said second road data is unreliable when invalid second road data are detected for said predetermined time.

14. The apparatus for controlling a vehicle according to claim 5, wherein said vehicle dynamic control value calculating means calculates said vehicle dynamic control values using said vehicle dynamic control values calculated immediately before said first road data became different from said second road data.

* * * * *